No. 686,126. Patented Nov. 5, 1901.
R. G. PILKINGTON.
VEHICLE TIRE.
(Application filed Apr. 22, 1901.)
(No Model.)
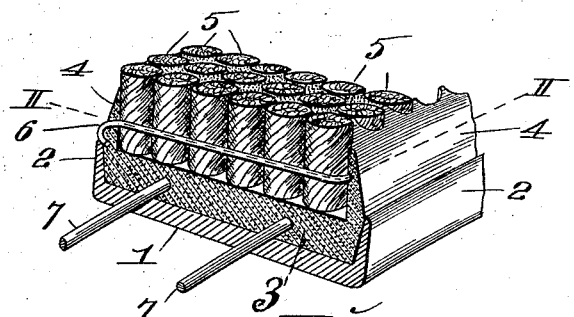
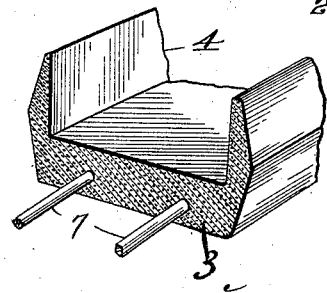
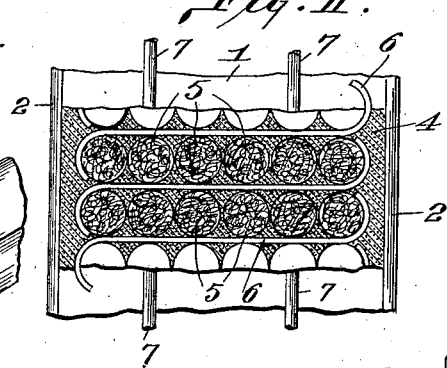
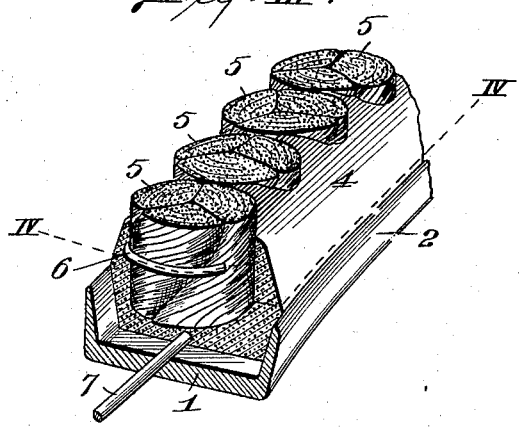
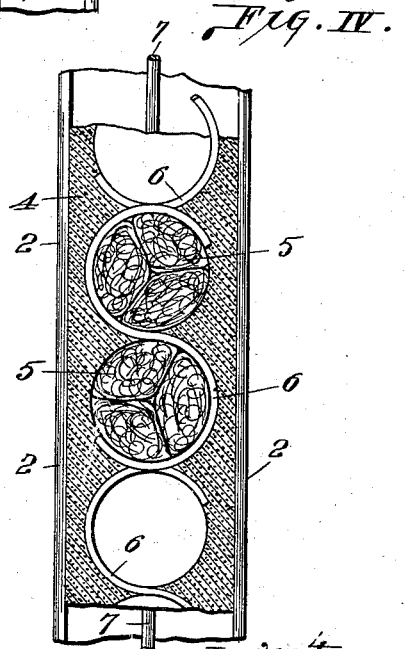
Attest:
M. P. Smith
E. S. Knight
Inventor:—
Robert G. Pilkington.
By Wright Bro.
Atty's.

UNITED STATES PATENT OFFICE.

ROBERT G. PILKINGTON, OF ST. LOUIS, MISSOURI, ASSIGNOR OF ONE-HALF TO ANDERSON GRATZ, OF KIRKWOOD, MISSOURI.

VEHICLE-TIRE.

SPECIFICATION forming part of Letters Patent No. 686,126, dated November 5, 1901.

Application filed April 22, 1901. Serial No. 56,983. (No model.)

*To all whom it may concern:*

Be it known that I, ROBERT G. PILKINGTON, a citizen of the United States, residing in the city of St. Louis, in the State of Missouri, have invented certain new and useful Improvements in Vehicle-Tires, of which the following is a full, clear, and exact description, reference being had to the accompanying drawings, forming part of this specification.

My improved tire is intended more especially for use on self-propelled vehicles, the object being to produce a tire which will have a maximum traction or friction upon the surface being traveled over and at the same time being durable in that it is not liable to be split or separated either in the direction of the circumference of the wheel or in a direction transversely thereof.

With this object in view my invention consists in features of novelty hereinafter fully described, and pointed out in the claims.

Figure I is a detail perspective view showing part of my improved tire. Fig. II is a detail top view. Fig. III is a detail perspective view of a tire made on a smaller scale than that illustrated in Figs. I and II. Fig. IV is a section taken on line IV IV, Fig. III. Fig. V is a detail perspective view of the rubber band before being vulcanized.

1 represents the metal rim or felly of the wheel, which is connected to the hub by spokes or in any other well-known way and which has outwardly-extending side flanges 2. Within the rim fits a rubber ring or band 3, that is provided with side flanges 4, extending some distance beyond the flanges 2 of the rim 1. The shape of the band 3 before being vulcanized is illustrated in Fig. V. Seated between the flanges 4 and on the flat bottom of the band are bodies 5, of fibrous material. These bodies are preferably short sections of rope which have been dipped in a rubber solution before being placed in position. They are placed so that the fiber comes end on to the ground, and they are held in the band by means of hooks 6, each hook having oppositely-bent ends, so that one end of each hook engages the outer body 5 of one series of bodies across the tire, while the other end of this hook engages the outer body of the next series at the opposite side of the tire, as shown in Fig. II. When the band has been filled with the bodies 5, the spaces between the bodies are filled with pieces of natural rubber dropped into place, and the whole is then placed in a mold under pressure and vulcanized. The vulcanization causes the upper edge of the flanges 4 to enter between the outer bodies 5 and to pass between the outer bodies and become united with the pieces of rubber that have been placed in the spaces between the bodies, the result being that the flanges 4, the filling-pieces dropped into the spaces, and the bodies 5 are vulcanized together in a homogeneous mass, the result being that the fibrous bodies are securely held to the rim of the wheel, and thus the fibers of these bodies are presented end on to the ground.

The traction effect of the tire is superior to any other tire known to me, while at the same time the thorough embedding of the fibrous bodies in the rubber and the existence of the rubber between and through the bodies produces a tire in which there are no seams running in the direction of the circumference of the wheel or in a transverse direction thereto, so that neither the traction pull on the wheel or a side thrust of the wheel on the ground will produce a split in the tire in either direction.

In Figs. III and IV, I have shown a tire made on a smaller scale than in the other figures, wherein a single row of fibrous bodies is employed, the upper portions of the flanges 4 of the band forming a sufficient body of rubber to fill the spaces between the bodies during vulcanization, thereby dispensing with the use of pieces of rubber dropped into the spaces between the fibrous bodies, as in the other figures.

The tire, speaking of the fibrous bodies and the band as a whole, is held to the rim or felly 2 in any well-known way—as, for instance, by wires 7, passed through the bottom of the band and the ends of which are secured together.

As the inner ends of the bodies bear against the flat surface of the rubber band, they are permitted to yield slightly when they strike an obstruction, which also adds to the durability of the tire.

I claim as my invention—

1. A vehicle-tire, consisting of a rubber band provided with side flanges, fibrous bodies fitting between the flanges of the band end on to the ground, and rubber filling between the bodies, all being united together in a homogeneous mass by vulcanization, substantially as set forth.

2. A vehicle-tire consisting of a rubber band having flanges, and fibrous bodies located between the flanges end on to the ground, and united thereto by the vulcanization of the rubber, substantially as set forth.

3. A vehicle-tire consisting of a rubber band and fibrous bodies vulcanized to the band end on to the ground, substantially as set forth.

4. A vehicle-tire consisting of a rubber band and sections of rope held to the band end on to the ground, substantially as set forth.

5. A vehicle-tire consisting of a rubber band and sections of rope vulcanized to the band end on to the ground, substantially as set forth.

6. A vehicle-tire consisting of a flanged rubber band and sections of rope fitting between the flanges of the band end on to the ground, and vulcanized to the band, substantially as set forth.

7. A vehicle-tire consisting of a flanged rubber band, sections of rope placed end on against the band between the flanges thereof, and hooks connecting the sections together, said sections and band being vulcanized together, substantially as set forth.

8. A vehicle-tire consisting of a flanged rubber band, and sections of rope dipped in a rubber solution and placed between the flanges of the band and united to the band by vulcanization.

ROBERT G. PILKINGTON.

In presence of—
 E. S. KNIGHT,
 M. P. SMITH.